United States Patent [19]

Kawabe et al.

[11] 3,801,313

[45] Apr. 2, 1974

[54] $Nb_3Ga$ BASE SUPERCONDUCTING MATERIALS

[75] Inventors: Ushio Kawabe; Mitsuhiro Kudo, both of Tokyo; Shigeo Fukase, Hachioji, all of Japan

[73] Assignee: Hitachi, Ltd., Tokyo, Japan

[22] Filed: May 19, 1972

[21] Appl. No.: 254,901

[30] Foreign Application Priority Data

May 20, 1971 Japan ............................... 46-34596

[52] U.S. Cl. ............... 75/174, 335/216, 148/32;133

[51] Int. Cl. ........ C22c 27/00, H01f 1/04, H01f 1/14

[58] Field of Search ...............75/174; 148/32, 133; 335/216

[56] References Cited

OTHER PUBLICATIONS

Zeitschrift fur Physik 215, 1968, pages 323–334.

J. Applied Physics, Vol. 40, No. 5, April 1968, pgs. 2000–2002.

Metallurgy of Advanced Electronic Materials, Brock, Metallurgical Society Conferences, Vol. 19, 1966, pgs. 71 & 81–83.

*Primary Examiner*—Charles N. Lovell

*Attorney, Agent, or Firm*—Craig and Antonelli

[57] ABSTRACT

A superconducting material having a critical temperature higher by 3° to 5°K than that of and a critical current density several times higher than that of $Nb_3Ga$ provided by replacing a part of atoms in the Ga sites of $Nb_3Ga$ with atoms of one of Al, Mn, Sb, and Y and, when required, replacing a part of atoms in the Nb sites with Ta atoms and by subjecting this intermetallic compound to an aging process at 800°C for 300 hours. This material has a β–W type crystal structure similarly to $Nb_3Ga$.

11 Claims, 8 Drawing Figures

CONCENTRATION OF Aℓ ATOMS y

UNIT CELL OF β-W TYPE CRYSTAL STRUCTURE

$Nb_3Ba$ BASE SUPERCONDUCTING MATERIALS

BACKGROUND OF THE INVENTION

1. FIELD OF THE INVENTION

The present invention relates to a superconducting material of an $Nb_3Ga$ base intermetallic compound having a $\beta$–W type crystal structure, and more particularly to a superconducting material having a high critical temperature and a high critical current density.

2. DESCRIPTION OF THE PRIOR ART

Superconducting materials have such interesting properties as perfect conductivity, diamagnetism, transition phenomenon, etc.

Various appliances utilizing these properties, such as superconducting magnets, magnetic shields, cryotrons, and the like have hitherto been developed.

Then, in the B C S theory the value of $\langle\omega_o\rangle$ is represented as an approximation to a value which is proportional to the order of the Debye temperature of the superconducting material, the value of V is constant, and $[N_{(o)}]$ is represented as an approximation to a value which is proportional to the electronic specific heat coefficient ($\gamma$) of the superconducting material.

Therefore, in order to obtain a superconducting material having a high critical temperature, it is necessary to find a material with a high Debye temperature and a high electronic specific heat coefficient.

Table 1 shows the critical temperature and crystal structure of some well known superconducting materials which have a considerably high critical temperature.

TABLE 1

| COMPOSITION | CRITICAL TEMPERATURE (Tc = °K) | CRYSTAL STRUCTURE (Type) |
|---|---|---|
| BINARY COMPOSITION | | |
| $Nb_3Sn$ | 17.8 – 18.3 | $\beta$-W |
| $Nb_3Al$ | 17.5 – 18.4 | do |
| $V_3Si$ | 16.4 – 17.1 | do |
| $V_3Ge$ | – 17.0 | do |
| $V_3Ga$ | 14.2 – 16.8 | do |
| NbN | 11.0 – 16.0 | NaCl |
| TcMo | 11.0 – 15.8 | do |
| $Nb_3Ga$ | 14.2 | $\beta$-W |
| MoC | 9.0 – 13.5 | NaCl |
| TaC | 9.0 – 11.4 | do |
| TERNARY COMPOSITION | | |
| $Nb_3Al_{0.8}Ge_{0.2}$ | 20.05 – 20.5 | $\beta$-W |
| $Nb_3Al_{0.7}Ga_{0.3}$ | 18.6 | do |
| $Nb_3Sn_{0.92}Al_{0.08}$ | 18.56 | do |
| $Nb_3Sn_{0.95}Al_{0.05}$ | 18.36 | do |
| $Nb_3Sn_{0.9}In_{0.1}$ | 18.0 – 18.28 | do |
| $Nb_3Sn_{0.9}Bi_{0.1}$ | 18.26 | do |
| $Nb_3Sn_{0.9}Tl_{0.1}$ | 18.26 | do |
| $Nb_3Sn_{0.9}Pb_{0.1}$ | 18.24 | do |
| $Nb_3Sn_{0.95}Ge_{0.05}$ | 18.1 | do |
| $Nb \cdot N_{0.5}C_{0.5}$ | 17.8 | NaCl |

Generally, in order to reveal the superconductivity, it is necessary to cool the superconducting materials at temperatures lower than their critical temperatures.

The critical temperature (Tc) of $Nb_3Sn$, which has been considered to be the superconducting material having the highest critical temperature, is 18°K.

Consequently, a cryogenic technique which utilizes expensive liquid helium as a coolant is necessary in order to cool these superconducting materials below their critical temperatures.

Under these circumstances the discovery of a superconducting material having even a little higher critical temperature than that of the known superconducting material has been greatly desired.

According to the B C S theory [J. Bardeen, et al., Phys. Rev., 108 (1957) 1175] relating to superconductivity, the critical temperature Tc of a superconducting material is represented by the following formula:

$$Tc \approx \langle\omega_o\rangle \exp(-1/g)$$

where $\langle\omega_o\rangle$ is the average angular frequency of the phonons that scatter electrons at the Fermi surface and $g$ is the product of the net attractive interaction between the electrons (V) and the density of states of d-electrons $[N_{(o)}]$ at the Fermi surface.

Some of the superconducting materials having a relatively high critical temperature are found in the group of intermetallic compounds, which have the $\beta$–W type crystal structure, the relatively high electronic specific heat coefficient ($\gamma$), and the high Debye temperature ($\theta_D$), i.e., $Nb_3Ga$, $Nb_3Al$, $Nb_3Al_{1-y}Ge_y$, and the like.

However, such superconducting materials having the $\beta$–W type crystal structure as mentioned above cannot be obtained until they are subjected to difficult aging such as 700°C × 1,000 hours. Thus, the manufacture of these materials is not easy.

On the basis of the McMillan's theory presented recently in Phys. Rev., 167 ('68) 331, by W. L. McMillan, the critical temperature of a superconducting material is given by the following formula;

$$Tc = \langle\omega_o\rangle/1.45 \; exp - [1.04(1+\lambda)]/[\lambda - \mu^*(1+0.62\lambda)],$$

where $\langle\omega_o\rangle$ is the average angular frequency of phonons, and $\mu^*$ and $\lambda$ are the electron-electron and electron-phonon coupling constants, respectively. By McMillan's theory, it is concluded that the maximum value of critical temperature of superconducting materials is within a range of 25°K to 40°K. However, no superconducting matrial having such a high critical temperature as the upper limit as predicted by McMillan of the critical temperature has yet been produced.

The critical temperatures of the intermetallic compounds as aged, represented by a general formula $Nb_3Al_{1-x}Ga_x$, which are provided by replacing a part of the Al atoms in $Nb_3Al$ with Ga atoms are shown in an article by G. Otto in Zeitschrift für Physik, 215 (1968) 328. It is reported in this article that a superconducting material having a critical temperature of 19.1°K was provided by an aging process at 800°C for 10 hours when the atomic concentration $x$ of Ga was 0.33. However, according to the article by Otto, the peak value of the critical temperature is present on the $Nb_3Al$ side only, and no peak is present on the $Nb_3Ga$ side, that is, on the $Nb_3Ga$ side the critical temperature monotonically increases with the amount of Al.

The ternary compound on the $Nb_3Al$ side at which the peak of the critical temperature is present is mechanically very hard and brittle, and the material as cast has many cracks and hence is practically unusable. For example, the Knoop hardness of $Nb_3Al_{0.8}Ga_{0.2}$ as cast is 895°Kp/mm².

SUMMARY OF THE INVENTION

An object of the present invention is to provide a superconducting material having a novel composition which can be made into a stable β–W type crystal structure and having a high critical temperature even by a relatively short period of treatment in contrast to the previously known superconducting materials as having relatively high critical temperatures which requires a considerable period of aging.

Another object of the present invention is to provide a superconducting material having a high critical temperature and a relatively high critical current density (Jc).

Another object of the present invention is to provide a superconducting material to be used under simpler cryogenic conditions than previously.

The superconducting material according to the present invention is provided by improving $Nb_3Ga$ which is known as one of the superconducting materials having high critical temperatures among the group of the superconducting binary intermetallic compounds having the β–W type crystal structure.

The superconducting materials of the present invention are characterized in that a suitable amount of Ga of the $Nb_3Ga$ is substituted by a third element M which has a larger atomic radius of a coordination number 12 than that of Ga, and which simultaneously has a higher Debye temperature than that of Ga. The third element is an element selected from the group consisting of aluminum (Al), antimony (Sb), manganese (Mn), and yttrium (Y).

Occasionally, according to the present invention a suitable amount of Nb of the material $Nb_3Ga$ is further substituted by tantalum (Ta).

Therefore, the chemical composition of the superconducting material of the present invention is represented by the following general formula;

$(Nb_{1-x}Ta_x)_kGa_{1-y}M_y$, where the values of $x$, $y$, and $k$ are selected to be within such ranges that it is easy to crystallize the composition into a desired β–W type crystal structure and hence heat treatment is also easy. Suitable ranges of the values of $x$, $y$, and $k$ are, $0 \leqq x \leqq 0.07, 0 < y \leqq 0.2$, and $3 \leqq k \leqq 4$, respectively. More preferably, the ranges of $x$ and $y$ are, $0 \leqq x \leqq 0.05$ and $0.01 \leqq y \leqq 0.2$.

DESCRIPTION OF THE PREFERRED EMBODIMENTS

Figure 1:
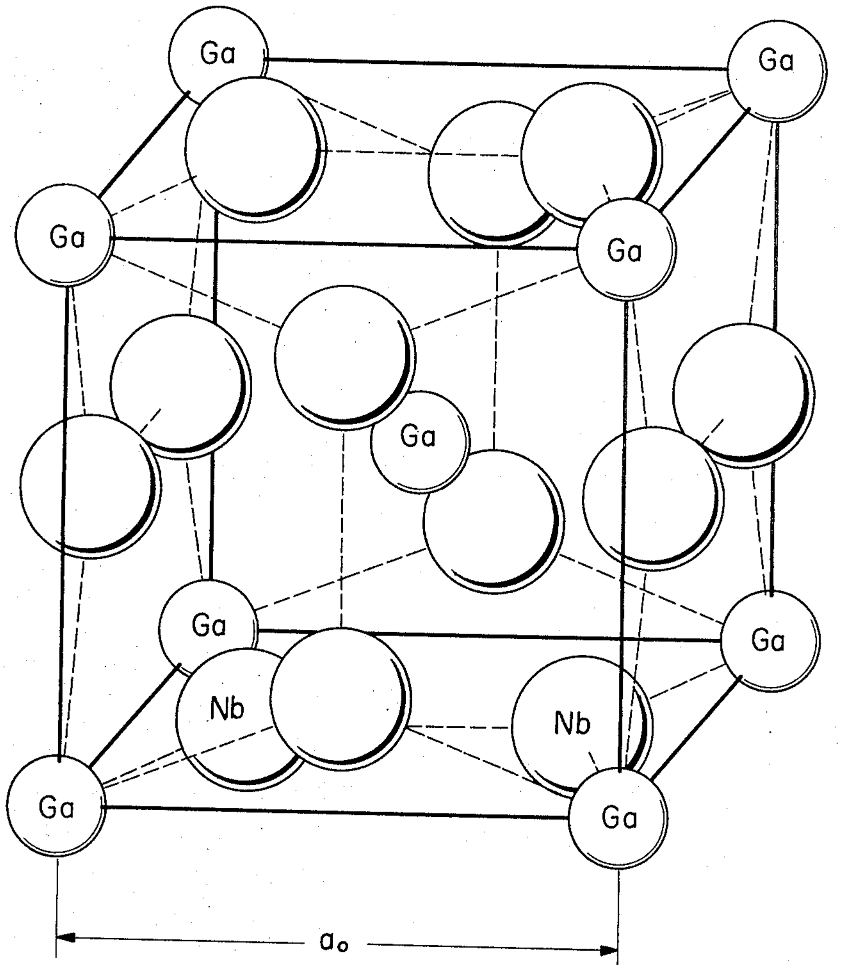
FIG. 1 is a schematic model of the β–W type crystal structure.

A model (unit cell) of the β–W type crystal structure of the intermetallic compound represented by a chemical formula $Nb_3Ga$ is shown in FIG. 1. It is characteristic of this crystal structure that it is constructed of a complex lattices structure comprising a body centered cubic crystal lattice consisting of Ga atoms and a chain like lattice consisting of Nb atoms in which each pair of Nb atoms are present in each of the faces of the body centered cubic lattice, three pairs of Nb atoms in three orthogonal faces of the body centered cubic lattice being orthogonal to each other.

In this superconducting material having the β–W type crystal structure, it is generally known that the critical temperature increases when the composition of the material approaches the stoichiometric composition and that the chains of Nb atoms form an extremely narrow d-band structure at the Fermi surface in the β–W type crystal structure.

Since in the d-band structure as aforesaid the density state of d-electron at the Fermi surface is increased, the critical temperature is thereby increased.

The present invention is based on the discovery by the inventors that when a part of either the Nb atoms or Ga atoms of the superconducting material $Nb_3Ga$ having a β–W type crystal structure are substituted by the atoms of a transition metal having an atomic radius different from those of the atoms of the superconducting material so that the ratio between the average radius of the atoms in the Nb-sites and the average radius of the atoms in the Ga-sites approaches 1, the β–W type crystal approaches the closest packed structure thereby facilitating the formation of the stable β-phase and providing a superconducting material having a high critical temperature.

More particularly, the present invention is based on the discovery by the present inventors that when the Ga atoms of the $Nb_3Ga$ are partially substituted by the atoms of an aforementioned third element selected from the group consisting of Mn, Al, Sb and Y, a material having a higher critical temperature than the base compound $Nb_3Ga$ can be provided.

Furthermore, the present invention is based on the discovery by the present inventors that when a suitable amount of Nb of the above-mentioned superconducting material is substituted by Ta in accordance with the present invention, the β–W type crystal structure approaches the closest packed structure and the material shows a more stable β-phase.

As raw materials, respective amounts of elements Nb, Ga, and a third element M (M = Al, Sb, Mn, Y, Hf, B, Be, Si and Zr) each having a purity of 99 percent up were prepared, and weighed quantities of them for various desired values of $x$, $y$, and $k$ of the chemical formula $Nb_kGa_{1-y}M_y$ were melted in an argon atmosphere in a plasma arc furnace, the melts were mixed and inverted several times to mix them uniformly, and the melts were solidified into pellets. The materials thus prepared were again melted using a levitation melting furnace, and then cast into a water-cooled copper mold to form a rod shape ingot (hereinafter referred to as an "as cast" specimen) of about 3 mm in diameter and about 30 mm long. Casting is conducted in an argon atmosphere.

The "as cast" specimen was muffled in an Nb foil and placed in a quartz tube, sealed in a high vacuum and then aged at a temperature of 600° to 1,200°C for 24 to 360 hours. Generally, the high vacuum is about $10^{-5}$ mmHg and preferably about $10^{-6}$ mmHg or higher vacua.

The values of $x$, $y$, and $k$ of the resulting intermetallic compounds were quantitatively determined by a chemical analysis, and the crystal structures and lattice constants thereof were examined by an X-ray powder diffraction method.

According to the result of the X-ray analysis, some of the "as cast" specimens showed X-ray diffraction patterns of the β–W type crystal structure, which patterns were observed to be broad. As the heat treatment proceeded, the patterns became sharp. Particularly effective heat treatment is done in a temperature range of from about 600° to about 1,100°C for a period of time equal to at least about 24 hours and preferably more than 100 hours and in some cases longer, e.g. 360 hours.

From the result of the above-mentioned investigations, it has been confirmed that $Nb_kGa_{1-y}M_y$, in which the values of $y$ and $k$ are selected within ranges of $0 < y \leqq 0.2$, and $3 \leqq k \leqq 4$, respectively, results in a favorable β–W type crystal structure by virtue of the above-mentioned heat treatment.

According to the present invention, more particularly, when the value of $y$ is within a range $0.01 \leqq y \leqq 0.2$ and when the value of $k$ is about 3, that is, the chemical composition comprises about 75 atomic percent of Nb, about 20–24.75 atomic percent of Ga, and about 0.25–5 atomic percent of the third element M, (M = Mn, Sb, Al or Y), the materials have relatively high critical temperatures as compared with the previously known compound $Nb_3Ga$.

The superconductive materials according to the present invention provided in such a manner are relatively lower in the hardness than that of the prior art $Nb_3Al$ base β–W type ternary intermetallic compounds, i.e. about 820 $Kp/mm^2$ in Knoop hardness, and hence cracks hardly occur in the materials as cast. Thus, the materials according to the present invention are mechanically extremely superior to the prior art materials.

The critical temperature was measured by a conventional four-probe resistivity technique when a current density of 1 $A/cm^2$ passed through a specimen of 30 mm long. The critical temperature was determined to be a temperature at which the resistivity of the specimen became one-half the difference between resistivities of the superconducting and normal states during the transition. The thermometer used in that measurement of the critical temperature is a germanium thermometer by Honeywell Co. in the U.S. which is calibrated at three temperatures of liquid helium, liquid hydrogen, and liquid nitrogen under an atmosphere.

Figure 2:
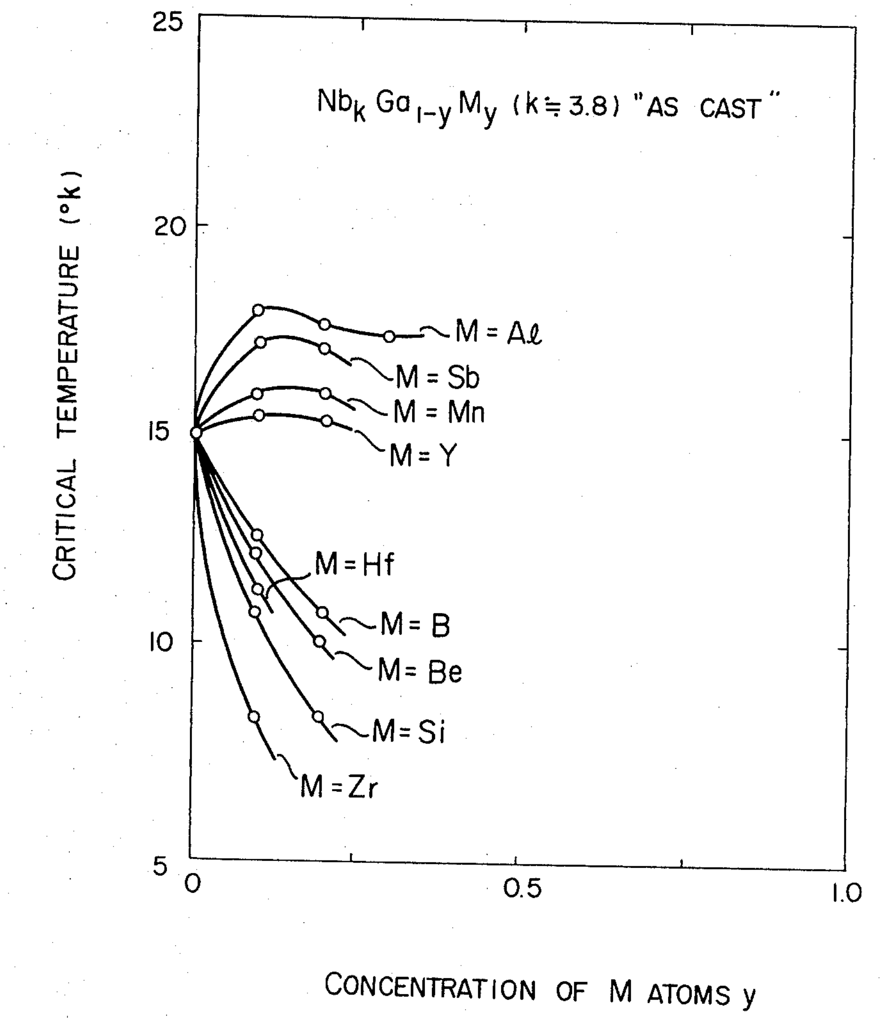
FIG. 2 is a graph showing the relation between the concentration of a third element M and the critical temperature of the materials "as cast" of the $Nb_3Ga_{1-y}M_y$ series.

FIG. 2 shows variations in the critical temperatures of $Nb_3Ga_{1-y}M_y$ (M = Al, Sb, Mn, Y, B, Be, Hf, Si and Zr) series ternary intermetallic compounds as cast. For M = B, Be, Hf, Si, or Zr, the critical temperature rapidly lowers from the critical temperature of $Nb_3Ga$ (about 15°K) with the atomic concentration y within a range of 0 to 0.2. On the contrary, for M = Al, Sb, Mn, or Y, the critical temperature thereof is higher than that of $Nb_3Ga$ at the values of the atomic concentration $y$ within a range of 0 to 0.3. A peak of the critical temperature exists within the range of $y$ between 0.1 and 0.2.

Figure 3:
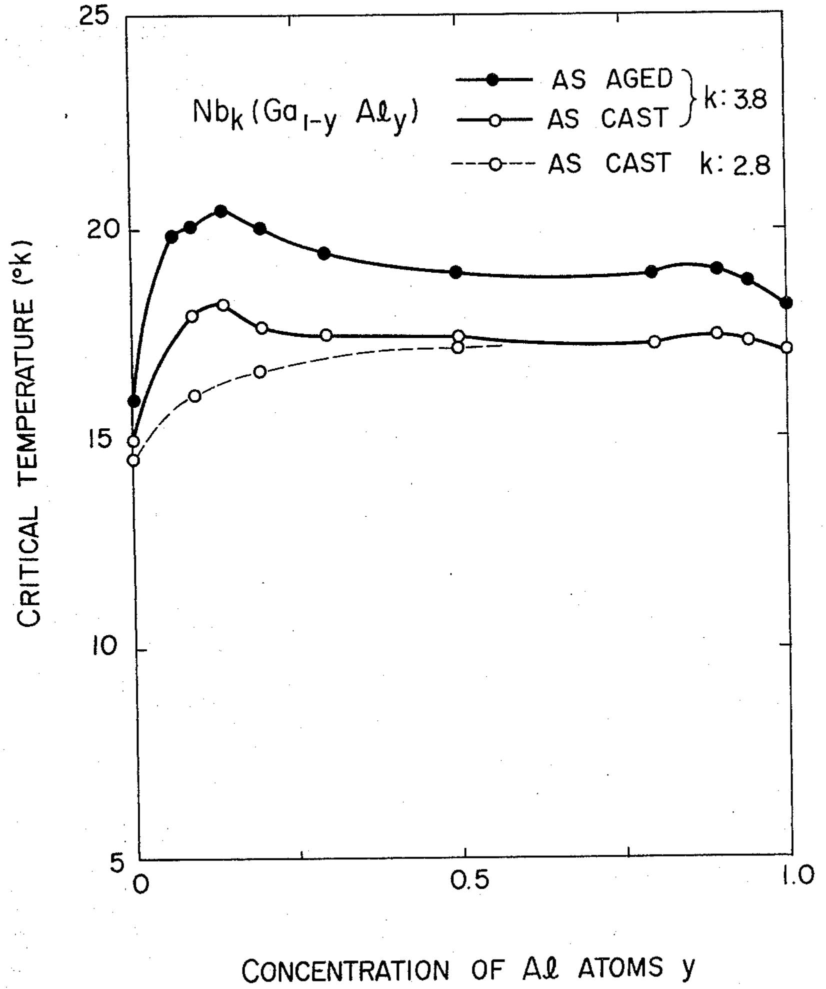
FIG. 3 is a graph showing the relation between the concentration of Al and the critical temperature of the material "as cast" and "as aged" of the $Nb_kGa_{1-y}Al_y$ series.

FIG. 3 shows the relations between the critical temperatures of $Nb_kGa_{1-y}Al_y$ series intermetallic compounds as cast and as aged (aging: 700°C × 300 hours), where $k$ is fixed at about 3.8, and the atomic concentration $y$ of Al. FIG. 3 also shows the relation for the case where $k$ is about 2.8. In the case of $k \approx 3.8$, two peaks of the critical temperature which are higher than those of the mother alloys $Nb_kGa$ (15°K) and $Nb_kAl$ (18.1°K) are present. The critical temperature of the ternary alloy is higher in the composition region of the atomic concentration $y$ of Al of about 0.05 and higher than that of $Nb_kAl$ ($y = 1.0$). The peak value of the critical temperature nearer to the composition $Nb_kGa$ at $y$ being about 0.15 is 20.6°K, and that nearer to the composition $Nb_kAl$ at $y \approx 0.9$ is 19.1°K. In the case of $k \approx 2.8$, the critical temperature monotonically increases with the atomic concentration in the region on the side of $Nb_kGa$, and no peak of the critical temperature is present.

Thus, it has been found that for $Nb_kGa_{1-y}Al_y$ series ternary alloy with $k \leqq 3$ having the β–W type crystal structure a first peak of the critical temperature lies on the $Nb_kGa$ side, and a second peak lies on the $Nb_kAl$ side. The compounds with $k < 3$, having the β–W type crystal structure, has, on the $Nb_kGa$ side, no peak of the critical temperature and the critical temperature monotonically lowers with the increase in the concentration of gallium atoms.

Consequently, by replacing a part of the atoms in the Ga sites of $Nb_kGa$ ($3 \leqq k \leqq 4$) by Al atoms, superconducting materials of a stable β–W type crystal structure can be provided which have the critical temperatures higher than those of the binary compounds $Nb_3Al$ and $Nb_3Ga$, and have superconductive characteristics equivalent to and lower brittleness than the ternary compound $Nb_3Al_{0.8}Ga_{0.2}$ having the known highest critical temperature. The region of composition at which such intermetallic compounds having the β–W type crystal structure and high critical temperatures are provided is 75 to 80 atomic percent for Nb, 1 to 24 atomic percent for Ga, and 1 to 24 atomic percent for Al.

Figure 4:
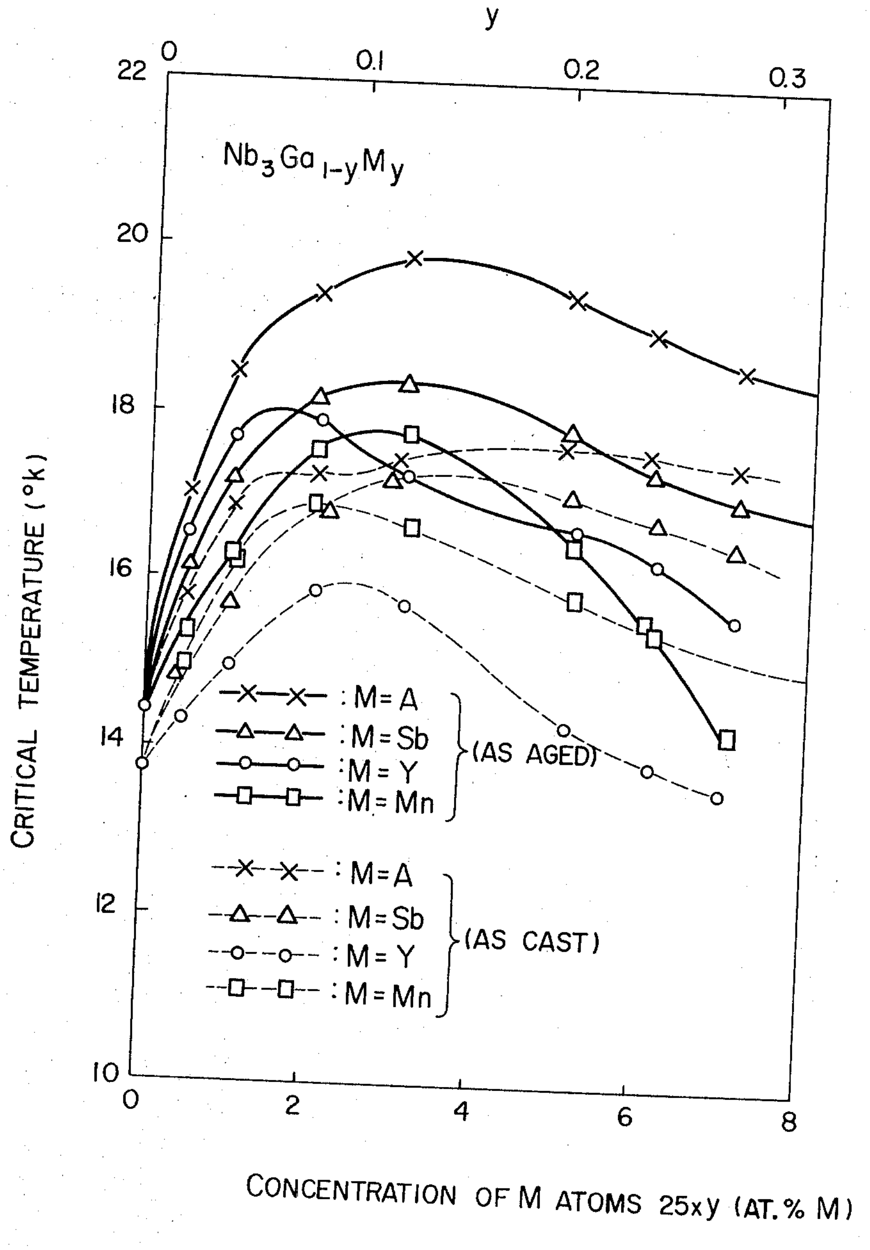
FIG. 4 is a graph showing the relation between the concentration of M (M = Mn, Sb or Y) and critical temperature of the material "as aged" of the $Nb_3Ga_{1-y}M_y$ series.

FIG. 4 shows the relationship between the concentration of third element M of $Nb_3Ga_{1-y}M_y$ (M = Al, Mn, Sb or Y) and the critical temperatures of "as cast" and "as aged" specimens provided under the same condition noted above. As seen from FIG. 4, the relation between the critical temperature and composition of these specimens is similar to that of the above-mentioned $Nb_{3.8}Ga_{1-y}Al_y$. The peak values of the critical temperature of the present "as aged" examples were 19.9°K ($M$ = Aluminum; $y = 0.15$), 18.5°K ($M$ = Antimony; $y = 0.12$), 18.1°K ($M$ = Yttrium; $y = 0.07$) and 17.8°K ($M$ = Manganese; $y = 0.10$).

Generally, in the present invention, the amount of Ta substituted for Nb is not more than about 5 atomic percent.

Figure 5:
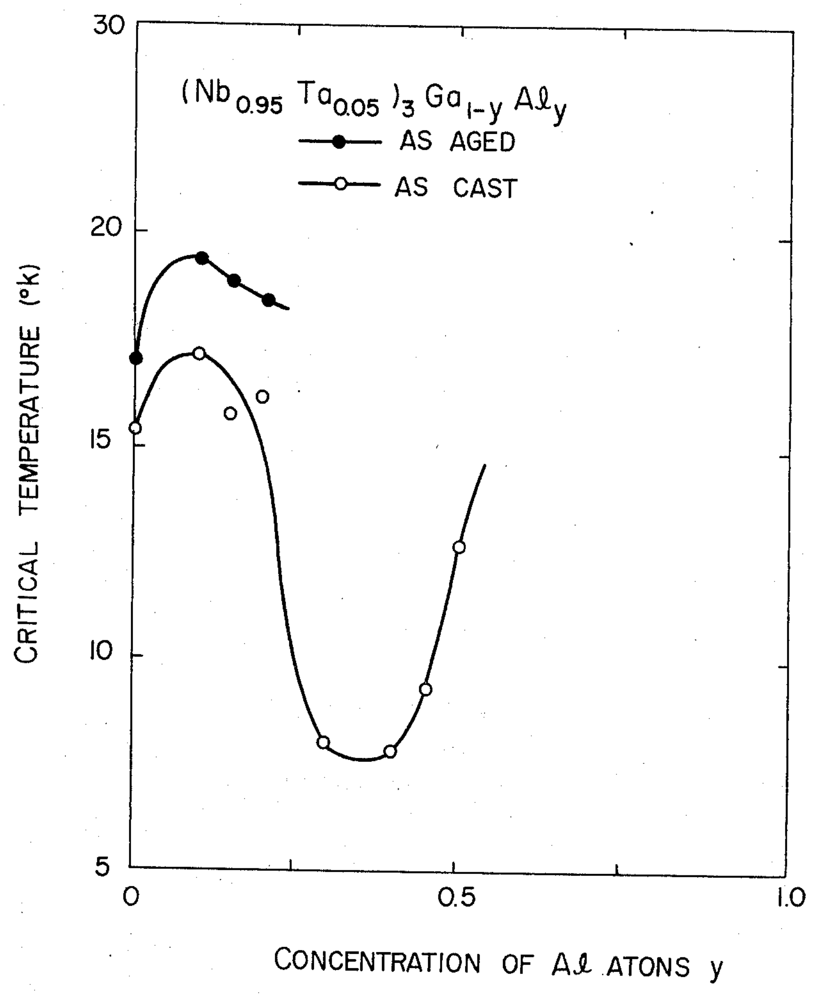
FIG. 5 is a graph showing the relation between the concentration of Al the the critical temperature of the material "as cast" and "as aged" of the $Nb_{0.95}Ta_{0.05}Ga_{1-y}Al_y$ series.

FIG. 5 shows the relation between the critical temperature and the atomic concentration $y$ of Al of the superconducting materials according to the present invention as cast and aged produced by substituting Ta atoms for a part of Nb atoms of $Nb_3Ga_{1-y}Al_y$. The conditions for manufacturing these materials are similar to those for the above-described embodiments. The aging process is 700°C × 30 hours. From these results it can be seen that by replacing a part of the atoms in the Nb-sites with Ta atoms a material as aged having a relatively high critical temperature and a more stable β–W type crystal structure can be produced with a relatively short time aging.

Figure 6:
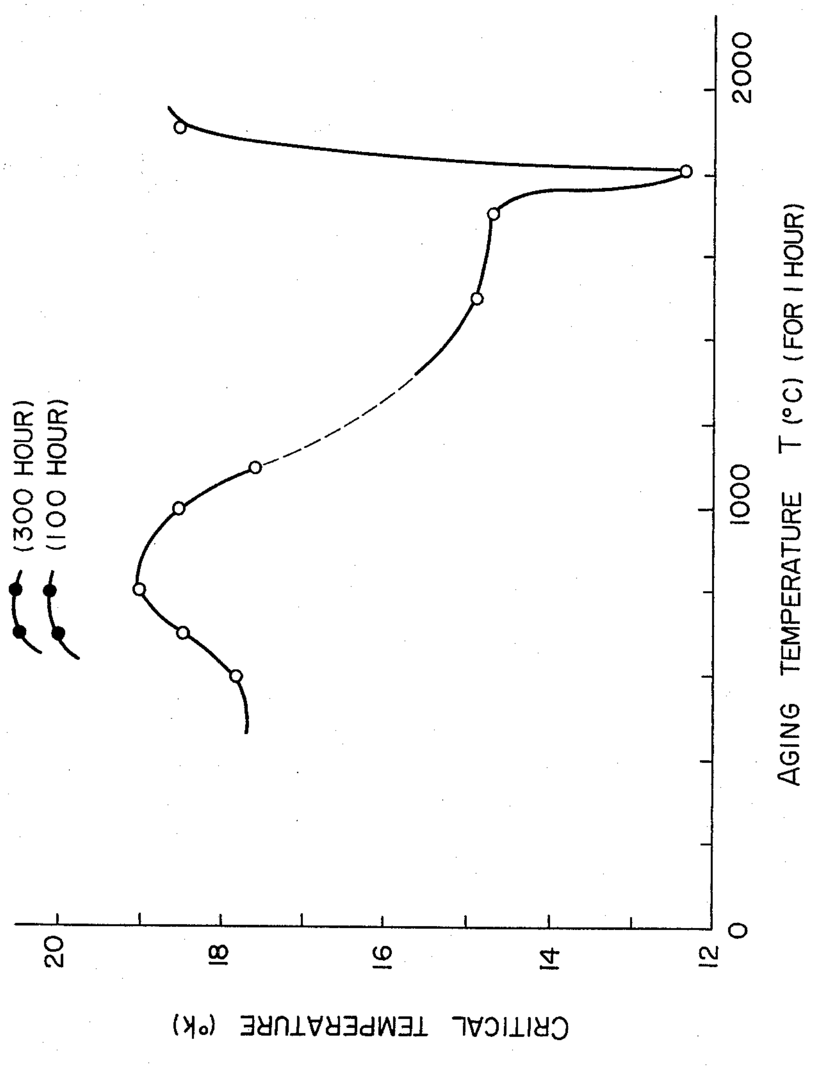
FIG. 6 is a graph showing the relation between the critical temperature and the aging temperature of $Nb_3Ga_{0.8}Al_{0.2}$.

FIG. 6 is an example of the relation between the critical temperature and the aging temperature of the superconducting material according to the present invention as aged. Though this example is for $Nb_3Ga_{0.8}Al_{0.2}$, other superconducting materials according to the present invention have also similar relations to that of FIG. 6. According to the curve of FIG. 6, the temperature suitable for aging the superconducting materials according to the present invention is at a range of from 600° to 1,000°C, in particular 700° to 1,000°C, and more preferably 750° to 950°C. As to the time duration for aging, even 1 hour or so already has a marked effect, and the longer the time duration is, the higher the critical temperature of the material as aged is. Though there is thus no upper bound of the time duration of aging, at a range of from about 300 up to 500 hours the rise of the critical temperature is substantially saturated. For this reason, from the standpoint of economy of time the aging time is preferably less than 500 hours, in particular between 100 and 300 hours.

The superconducting materials according to the present invention is excellent not only in having high critical temperatures, but also in having high critical current characteristics.

Figure 7:
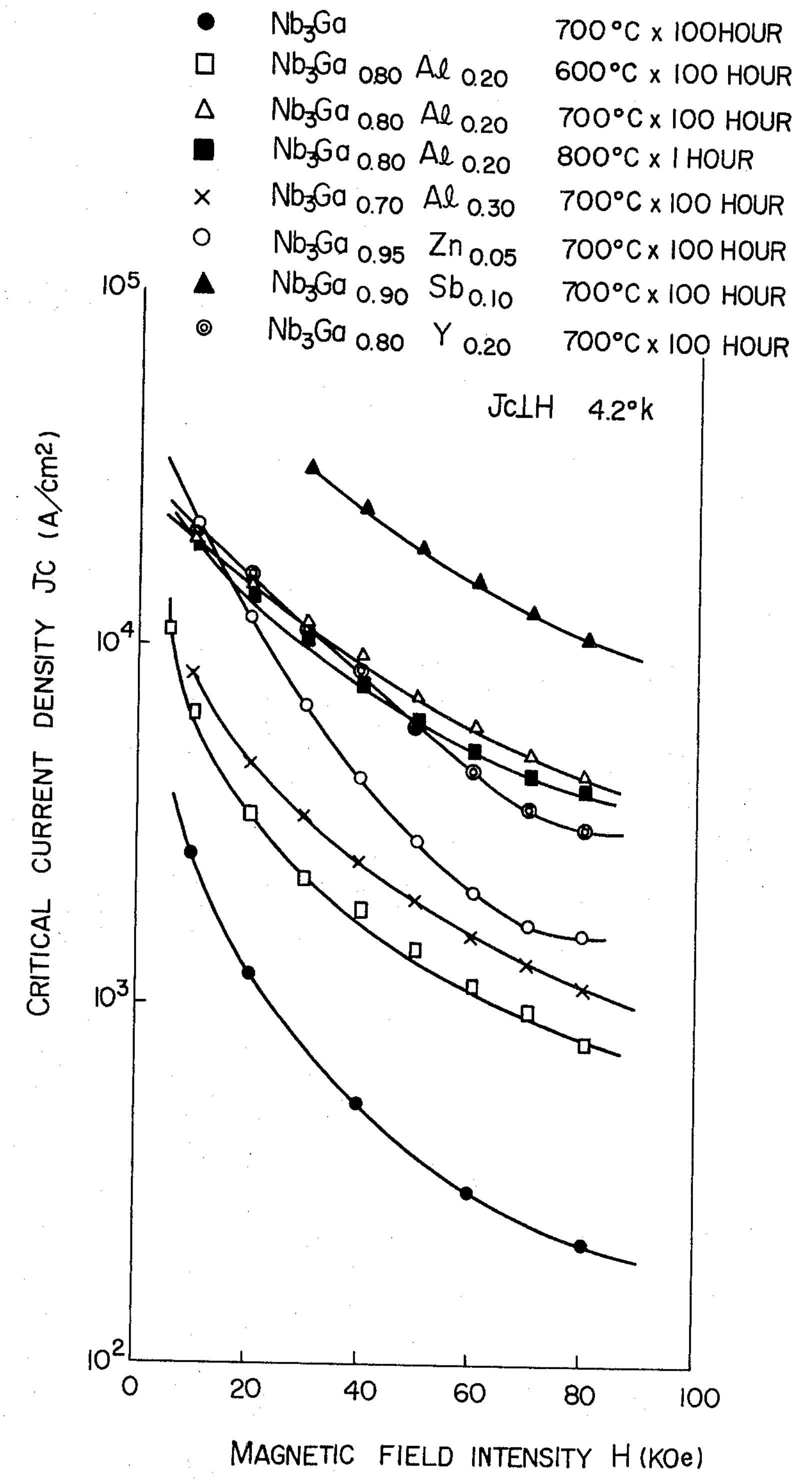
FIG. 7 is a graph showing the H–Jc curve of several materials of this invention and that of previously known $Nb_3Ga$.

FIG. 7 shows a comparison between the characteristics as regards the critical current densities (Jc) of the superconducting materials according to the present invention and that of $Nb_3Ga$. It is evident from FIG. 7 that the superconducting materials according to the present invention have critical current densities several to ten odd times higher than that of $Nb_3Ga$.

Figure 8:
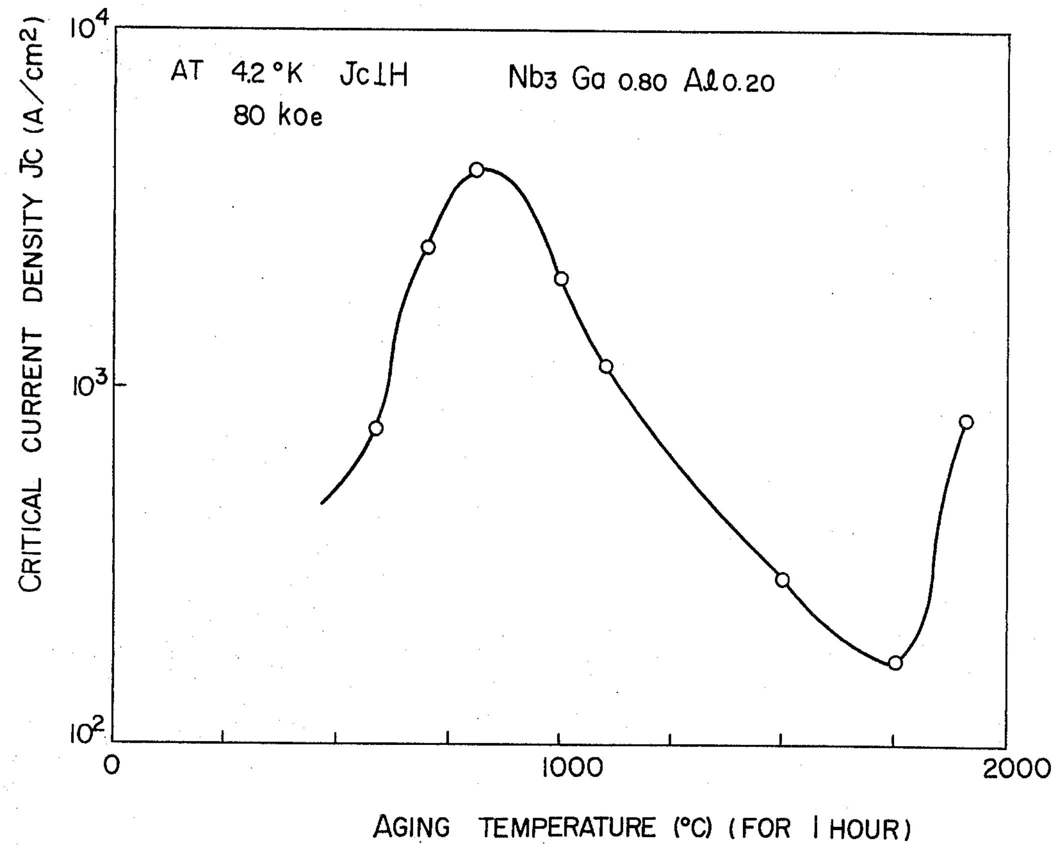
FIG. 8 is a graph showing the relation between the critical current density and the aging temperature of $Nb_3Ga_{0.80}Al_{0.20}$.

FIG. 8 shows the exemplary relation between the critical current density and the aging temperature of the superconducting material according to the present invention as aged in which $Nb_3Ga_{0.8}Al_{0.2}$ is taken as an example. The critical current density was measured at 4.2°K, and the intensity of the magnetic field orthogonal to the current was 80 kOe. The aging time was 1 hour. It is evident from FIG. 8 that the superconducting material according to the present invention has a critical current density higher than $10^3$ A/cm$^2$ at temperatures of from 500° to 1,100°C and under a magnetic field of 80 kOe, and in particular has a very high critical current density of $4 \times 10^3$ A/cm$^2$ at an aging temperature of about 850°C.

All of the above described superconducting material embodying the present invention were manufactured by melting in a plasma arc furnace. For putting these superconducting materials having excellent characteristics into practical use, it is desirable to form them into the shape of a composite tape by depositing a layer of the superconducting material on a predetermined substrate, for example, a niobium substrate by a vapor phase reaction method, a melt clad diffusion method or the like.

When a composite superconducting tape is to be produced by a vapor reaction method, halides of the component elements, for example, $NbCl_4$, $GaCl_3$ and $AlCl_3$ vapors are passed over a tape of stainless steel or other refractory alloys heated to 800° to 1,200°C to be subjected to hydrogen reduction. Then, by the chemical reaction represented by the chemical reaction formula, $$2k\cdot NbCl_4 + 2(1-y)\cdot GaCl_3 + 2y\cdot AlCl_3 + (4k+3)\cdot H_2 \rightarrow 2Nb_kGa_{1-y}Al_y + 2(4k+3)\cdot HCl$$

a layer of a compound $Nb_kGa_{1-y}Al_y$ ($3 \leqq k \leqq 4$) is deposited on the tape to a thickness of several microns. Of course, in order to eliminate the instability of the critical current on the low magnetic field side, it may be well to cover the compound layer with an ordinary conducting metal having a high electric conductivity and a large thermal diffusion coefficient such as copper or silver by plating or cladding as is commonly known. It is also possible to grow an $Nb_kGa_{1-y}Al_y$ layer from the vapor phase by employing reaction vapors of iodides or bromides of Nb, Ga and Al.

When an immersion clad diffusion method is employed, a sufficiently clear Nb plate or an Nb-Ta alloy plate of an appropriate dimension is passed in a thermostat bath of molten Ga-Al alloy placed in a vacuum or in an inert atmosphere such as argon atmosphere to clad the plate or tape on its both surfaces with a predetermined Ga-Al alloy to a thickness of several microns, and then passed through a high temperature furnace maintained at a temperature of from 800° to 1,600°C in a vacuum or in an inert atmosphere such as argon atmosphere to subject it to heat treatment so that a layer of $Nb_kGa_{1-y}Al_y$ or $(NbTa)_kGa_{1-y}Al_y$ is formed on the tape by diffusion. It is also possible to form an intermediate phase having relatively high compompositions of Ga and Al by diffusion at low temperatures followed by the formation of $Nb_kGa_{1-y}Al_y$ or $(NbTa)_kGa_{1-y}Al_y$ by heat treatment at relatively low temperatures for diffusion.

As is evident from the above detailed description, the superconducting materials according to the present invention of a novel composition of Nb-Ga-M or Nb-Ta-Ga-M (M = Al, Sb, Mn or Y) and of β–W type crystal structure have a critical temperature of 20.6°K at a maximum and are relatively easy to manufacture. Consequently, these superconducting materials can be used with a liquid hydrogen coolant at an ordinary pressure or reduced pressures. Such a mitigation of cooling conditions greatly improve the economy of superconductive appliances.

We claim:

1. A superconducting material consisting essentially of an intermetallic compound having a β-W type crystal structure, said compound being represented by the formula:

$(Nb_{1-x}Ta_x)_kGa_{1-y}M_y$ where M is an element selected from the group consisting of Mn, Sb, Y, and Al, and the values of $x$ and $y$ are $0 \leqq x \leqq 0.07$ $0 < y \leqq 0.2$, respectively, and the value of $k$ is about 3.8.

2. A superconducting material consisting essentially of an intermetallic compound having a β-W type crystal structure, said compound being represented by the formula:

$(Nb_{1-x}Ta_x)_kGa_{1-y}M_y$ where M is an element selected from the group consisting of Mn, Sb, Y and Al, and the values of $x$, $y$, and $k$ are $0 \leqq x \leqq 0.07$ $0 < y \leqq 0.2$, and about $3.8 \leqq k \leqq 4.0$, respectively.

3. A superconducting material according to claim 2, wherein the values of $x$, $y$, and $k$ are $0 \leqq x \leqq 0.05$, $0.025 \leqq y \leqq 0.15$, and $k = 3.8$, respectively.

4. A superconducting material according to claim 1, wherein the value of $k$ is 3.8, and wherein the superconducting material has a critical temperature of about 20.6°K.

5. A superconducting material according to claim 4, wherein the value of $x$ is 0 and the value of $y$ is about 0.15.

6. A superconducting material according to claim 1, wherein said intermetallic compound is $Nb_{3.8}Ga_{1-y}Al_y$, where $0 < y \leqq 0.2$.

7. A superconducting material according to claim 1, wherein said intermetallic compound is $Nb_{3.8}Ga_{1-y}Sb_y$ where $0 < y \leqq 0.2$.

8. A superconducting material according to claim 1, wherein said intermetallic compound is $Nb_{3.8}Ga_{1-y}Mn_y$ where $0 < y \leqq 0.2$.

9. A superconducting material according to claim 1, wherein said intermetallic compound is $Nb_{3.8}Ga_{1-y}Y_y$ where $0 < y \leqq 0.2$.

10. A superconducting material according to claim 6, wherein $y$ has a value of about 0.15 and the superconducting material has a critical temperature of about 20.6°K.

11. A superconducting material consisting essentially of an intermetallic compound having a β-W type crystal structure, said compound being represented by the formula:

$(Nb_{1-x}Ta_x)_kGa_{1-y}M_y$ where M is an element selected from the group consisting of Mn, Sb, and Y, and the values of $x$, $y$ and $k$ are, respectively, $0 \leqq x \leqq 0.07$ $0 < y \leqq 0.2$ $3 \leqq k \leqq 4$.

* * * * *